United States Patent [19]
Skaletzky

[11] 3,760,081
[45] Sept. 18, 1973

[54] METHOD OF TREATMENT
[75] Inventor: Louis L. Skaletzky, Kalamazoo, Mich.
[73] Assignee: The Upjohn Company, Kalamazoo, Mich.
[22] Filed: Jan. 24, 1972
[21] Appl. No.: 220,406

Related U.S. Application Data
[63] Continuation-in-part of Ser. No. 44,903, June 9, 1970, abandoned.

[52] U.S. Cl. .............................................. 424/273
[51] Int. Cl.............................................. A61k 27/00
[58] Field of Search .................................... 424/273

[56] References Cited
UNITED STATES PATENTS
3,336,191   8/1967   Craig et al. .......................... 424/273
3,401,171   9/1968   Craig et al. .......................... 424/273

Primary Examiner—Jerome D. Goldberg
Attorney—Hans L. Berneis et al.

[57] ABSTRACT

Compounds of the formula 1

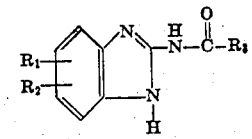

and the pharmacologically acceptable acid addition salts thereof, wherein $R_1$ is hydrogen, lower-alkyl, lower alkoxy, halogen or $-CF_3$; $R_2$ is hydrogen, lower-alkyl, lower-alkoxy, halogen or $-CF_3$ and $R_3$ is lower alkyl are prepared in pharmacologically acceptable formulations are used treating hypertension in warm-blooded, hypertensive animals free of helminthic infestations by administration of such compounds and compositions thereof at a dosage of from 5–50 mg./kg. per day.

4 Claims, No Drawings

METHOD OF TREATMENT

CROSS-REFERENCE TO RELATED APPLICATIONS

This application is a continuation-in-part application of application Ser. No. 44,903, filed June 9, 1970, and now abandoned.

BACKGROUND OF THE INVENTION

1. Field of the Invention

This invention is concerned with a method of treatment for hypertension with new and old organic compounds. More particularly this invention relates to 2-alkanoamidobenzimidazoles of the formula I:

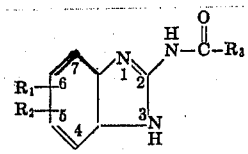

I wherein $R_1$ is selected from the group consisting of hydrogen, alkyl of one to six carbon atoms, inclusive, alkoxy of one to six carbon atoms, inclusive, chlorine, bromine, fluorine, and $-CF_3$; wherein $R_2$ is selected from the group consisting of hydrogen, alkyl, defined as above, chlorine, bromine, fluorine, alkoxy defined as above, and $-CF_3$; and wherein $R_3$ is alkyl of one to four carbon atoms, inclusive, and their use.

2. Description of the Prior Art

The compounds of formula I above, the process of preparing them has been described in U.S. Pat. Nos. 3,336,191 and 3,401,171. In these patents the use of these compounds is anthelmintic. From 5 to 500 mg./kg. per day is administered to animals (U.S. Pat. No. 3,336,191). No disclosure of antihypertensive action has been noted in these patents.

BRIEF SUMMARY OF THE INVENTION

This invention is concerned with new organic compounds, their use and the use of known compounds, and more particularly with the use of 2-alkanoamidobenzimidazoles

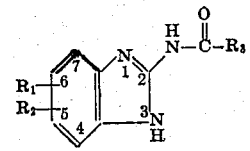

wherein $R_1$ is selected from the group consisting of hydrogen, alkyl of one to six carbon atoms, inclusive; alkoxy of one to six carbon atoms, inclusive, chlorine, bromine, fluorine, and $-CF_3$; wherein $R_2$ is selected from the group consisting of hydrogen, alkyl, defined as above, chlorine, bromine, fluorine, alkoxy, defined as above, and $-CF_3$; wherein $R_3$ is an alkyl of one to four carbon atoms, inclusive, and their use.

Also included is the use of these compounds as pharmacologically acceptable acid addition salts, and in formulations with other active hypertensive reagents, diuretics, tranquilizers or with pharmacological acceptable carriers. Another objective of this invention is the method of treatment for hypertension in warm-blooded animals by administration of the above compounds or formulations thereof.

DESCRIPTION OF THE PREFERRED EMBODIMENTS

The alkyl groups of one to six and one to four carbon atoms, inclusive, in formula I are exemplified by methyl, ethyl, propyl, isopropyl, butyl, isobutyl, sec. butyl, pnetyl, 2-methylbutyl, hexyl, 2-methylpentyl, 3-methylbutyl, 2,2-dimethylbutyl, and the like.

The alkoxy groups of one to six carbon atoms include methoxy, ethoxy, propoxy, butoxy, isopropoxy, isobutyloxy, sec. butoxy, pentoxy, hexoxy, 2-methylpentoxy, 3-methylpentoxy and the like.

The pharmacological acid addition salts include the hydrochlorides, hydrobromides, sulfates, phosphates, acetates, salicylates, cyclohexanesulfamates, methanesulfonates, ethanesulfonates tartrates, citrates, malonates, lactates, and the like.

The new compounds of formula I are made by the methods disclosed in U.S. Pat. Nos. 3,336,191 and 3,401.171, or equivalent British Patents, e.g., No. 1,122,957. The process of preparing the new products of this invention, 2-acetamido-5,6-dimethylbenzimidazole, and hydrochloride thereof is shown in Examples 1. These Examples are also illustrative for the production of other compounds of formula I, whose synthesis may not be specifically disclosed in the prior-disclosed patents.

A compound of the Formula I or pharmacologically acceptable acid addition salts thereof are presented for oral administration in solid and liquid unit dosage forms, such as tablets, capsules, powders, granules, syrups, elixirs, and the like, containing suitable quantities of the compound.

Powders are quite simply prepared by comminuting a compound of the Formula I or pharmacologically acceptable acid addition salts thereof to a suitably fine size and mixing with a similarly comminuted diluent. The diluent can be an edible carbohydrate material such as starch or lactose. Advantageously, a sweetening agent or sugar is present as well as a flavoring agent. Dry granulations for reconstitution with water are prepared utilizing water-soluble diluents. A powder mixture of finely divided compound of the Formula I or pharmacologically acceptable acid addition salts thereof and a water-soluble diluent such as sucrose, glucose, and the like, is wetted with a binder such as acacia mucilage or geltain solution and forced through a screen to form granules which are allowed to dry. Advantageously, a thickening or suspending agent such as methylcellulose is present as well as a wetting and flavoring agent.

Capsules are produced by preparing a powder mixture as hereinbefore described and filling into formed geltain sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing a compound of the Formula I and pharmacologically acceptable acid addition salts thereof suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. An alternative granulating procedure is slugging the powder mixture, i.e., run the powder mixture through a tablet machine and breaking the resulting large tablets into pieces (slugs). The slugs can be lubricated to prevent sticking to the tablet-forming dies by means of the addition of stearic acid, a stearate salt, talc, or mineral oil. The lubricated mixture is then compressed into tablets of the required weight.

Advantageously, the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of a compound of the Formula I and pharmacologically acceptable acid addition salts thereof for administration.

A syrup is prepared using a water soluble salt of a compound of the Formula I in a suitable flavored aqueous sucrose solution. Similarly an elixir is prepared utilizing a hydroalcoholic vehicle. Elixirs are advantageous vehicles for use when another therapeutic agent which is not sufficiently water soluble is to be included in the composition.

For parenteral administration aqueous fluid unit dosage forms can be prepared. In preparing the parenteral form, a measured amount of a water soluble salt of a compound of the Formula I and a pharmcologically acceptable acid is placed in a vial, the vial and its contents sterilized and sealed. An accompanying vial of sterile water is provided as a vehicle to form a solution prior to administration. Advantageously, the sterile water can have dissolved therein a local anesthetic and buffering agents.

Alternately, a parenteral suspension can be prepared by suspending an insoluble form of a compound of the Formula I in a sterile aqueous vehicle or in a parenterally acceptable vegetable oil with or without additional adjuvants.

For the treatment of warm-blooded hypertensive animals free of helminthic infestation by oral administration, a compound of the Formula I and pharmacologically acceptable acid addition salts thereof is conveniently prepared in the form of a food premix. The food premix can comprise the active material in admixture with an edible diluent such as starch, oatmeal, flour, calcium carbonate, talc, dried fish meal and the like non-toxic, orally acceptable edible diluents. The prepared premix is then conveniently added to the regular feed, thereby providing medication to the animal in the course of feeding.

The compounds of formula I and their acid addition salt produce a decrease of blood pressure and of hypertension in warm-blooded animals, mammals, e.g., rats, dogs (when infused), monkeys, etc., and also birds.

The blood pressure decrease has been principally evaluated in rats.

Female rats (two or four) of about 300 g. weight are prepared for measuring blood pressure directly from the aorta through a chronic indwelling cannula [Weeks et al., Proc. Soc., Exptl, Biol. Med. Vol. 104, page 646 (1960)]. The mean arterial pressure is measured prior to, and 4 and 24 hours after drug administration. The administration in rats was oral, unit dosages of 50 mg./kg. or submultiples thereof. Compounds which reduce the mean arterial pressure by 10 or more mm of Hg are considered active compounds.

Results: (Blood pressure reductions in the rat)

| Compound | Dosage mg./kg. | Mean Blood Pressure in mm Hg | | |
|---|---|---|---|---|
| | | initial B. P. | Hour | |
| | | 0 | +4 | +24 |
| 2-acetamido-5,6-dimethylbenzimidazole hydrochloride | 50 | 139 | 96 (−43) | 128 (−11) |
| | 25 | 129 | 99 (−30) | 123 (−6) |
| | 12.5 | 135 | 104 (−31) | 137 (+2) |
| | 6.25 | 136 | 125 (−11) | 134 (−2) |
| 2-acetamido-6-methoxybenzimidazole | 50 | 138 | 109 | 129 |
| | 25 | 134 | 115 | 135 |
| 2-propionamido-5,6-dimethylbenzimidazole | 50 | 134 | 110 | 126 |
| | 25 | 131 | 116 | 128 |
| 2-acetamido-4-methylbenzimidazole | 50 | 134 | 120 | 133 |
| | 25 | 139 | 128 | 139 |
| 2-acetamido-6-trifluoromethylbenzimidazole | 50 | 135 | 124 | 130 |
| | 25 | 135 | 126 | 129 |
| 2-acetamido-5,6-dimethoxybenzimidazole | 50 | 130 | 92 | 112 |
| | 25 | 132 | 96 | 128 |
| | 12.5 | 140 | 107 | 137 |
| | 6.25 | 137 | 115 | 134 |
| | 3.12 | 138 | 122 | 133 |

The acute $LD_{50}$ of 2-acetamido-5,6-dimethylbenzimidazolo hydrochloride (U−27,518A); measured in rats, orally 359 mg./kg.

A 14-day duration study in dogs showed that 100 mg./kg. of U−27,518A was well tolerated. Even 300 mg./kg. for 4 days in dogs caused no letal effect.

The amount of compound of formula I and the pharmacologically acceptable salts thereof to be administered varies with weight, age, condition, route of administration and species of animal. In general a dose of 5 to 50 mg. daily per kg. in single or divided dosages is administered. The adult human daily dosage is preferably between 100–1,500 mg. in single or divided dosages.

The compound can also be administered with other active agents, e.g., with hypertensive agents, such as hydralazine hydrochloride, hexamethonium bromide, mecamylamine hydrochloride, phenoxybenzamine hydrochloride, guanethidine sulfate, methyldopa or the like; or with diuretic agents such as ethoxyzolamide, hydrochlorothiazide, trichloromethazide, acetazolamide; or with sedatives and tranquilizers, e.g., phenobarbital, pentobarbital, chloral hydrate, chlorpromazine, thioridazine, diazepam, chlordiazepoxide and the like.

In combination besides the benzimidazole, the following other active compounds can be administered with dosages as indicated: anti-anxiety and tranquilizing agents: chlorpromazine (5–50 mg.), meprobamate (100–400 mg.), ectylurea (100–300 mg.), chlordiazepoxide (5–50 mg.) and diazepam (2–15 mg.); antidepressants such as amitriplyline HCl (10–50 mg.), methylphenidate HCl (5–20 mg.), d-amphetamine SO₄ (2–15 mg.) and methamphetamine HCl (2–15 mg.); antihypertensive and diuretic agents such as hydrochlorothiazide (15–50 mg.), hydralazine (10–100 mg.), methyldopa (100–250 mg.), guanethidine (10–50 mg.), ethoxzolamide (50–150 mg.) and reserpine (0.25–1 mg.), barbiturates such as phenobarbital (8–60 mg.) butabarital (8–60 mg.) and amobarbital (16–120 mg.); analgesics such as aspirin (150–600 mg.) and acetominophen (150–600 mg.).

The following examples illustrate the best mode contemplated by the inventor for carrying out the invention, but are not to be construed as limiting the scope thereof.

EXAMPLE 1

2-Acetamido-5,6-dimethylbenzimidazole and its hydrochloride

The 2-amino-5,6-dimethylbenzimidazole [ref, L. Joseph, J. Med. Chem., Vol 6, page 601 (1963)] was heated with acetic anhydride for 1 hour on the steam bath. The mixture was then poured into ice-water. A solid separated which was recovered by filtration, washed with water and dired to give 2-acetamido-5,6-dimethylbenzimidazole which after recrystallization from ethanol had a melting point of 306°–307° C.
Anal, calcd. for $C_{11}H_{13}N_3O$:
  C, 65.00 H, 6.45; N, 20.68.
  Found: C, 65.11; H, 6.65; N, 20.38.

The hydrochloride of 2-acetamido-5,6-dimethylbenzimidazole was prepared by suspending 16.4 g. of the free base in methanol and adding an excess of alcoholic hydrogen chloride. The mixture was heated to boiling, filtered and the filtrate diluted with ether giving (two crops) 9.85 g. of 2-acetamido-5,6-dimethylbenzimidazole hydrochloride. The analytical purified sample had a melting point of 249°–296° C.
Anal. calcd. for $C_{11}H_{13}N_3O \cdot HCl$:
  C, 55.11; H, 5.89; N, 17.53; Cl, 14.79.
  Found: C, 54.81; H, 5.61; N, 17.25; Cl, 15.13.

EXAMPLE 2

2-Acetamido-5,6-dimethylbenzimidazole (alternate method)
A. 1-Acetyl-2-methyl-2-thiopseudourea hydriodide To a solution of 74.73 g. (0.633 mole) of N-acetylthiourea in 1 l. of ethyl acetate was added 135 g. of methyl iodide and the mixture was stirred under reflux for 0.5 hour. During this period the product separated from the solution. The reaction mixture was cooled to room temperature, filtered and dried yielding 137.5 g. (83 percent) of 1-acetyl-2-methyl-2-thiopseudourea hydriodide of melting point 162°–163° C.
Anal. calcd. for $C_4H_8N_2OS \cdot HI$:
  C, 18.47; H, 3.49; N, 10.77.
  Found: C, 19.00; H, 3.95; N, 10.22.
B. 2-Acetamido-5,6-dimethylbenzimidazole.

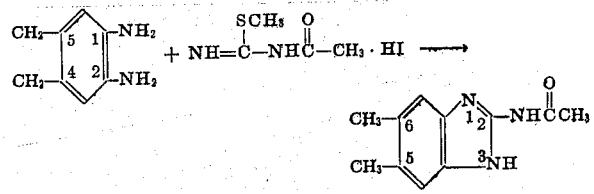

To a solution of 13.5 g. (0.10 mole) of 4,5-dimethyl-o-phenylenediamine in 250 ml. of $CH_3OH$ was added 26 g. (0.10 mole) 1-acetyl-2-methyl-2-thiopseudourea hydriodide and the mixture heated on the steam-bath at reflux for 5–20 minutes. During this time, the product precipitated as a light brown solid. The solid was filtered and dried to give 14.25 g. (70 percent) of 2-acetamido-5,6-dimethylbenzimidazole of melting point 306.5°–307° C.

In the manner given in Examples 1 or 2 the following other benzimidazoles were made:
2-acetamidobenzoimidazole (m. p. 323°–326° C.).
2-acetamido-5-methylbenzimidazole (m. p. 294°–296° C.).
2-acetamido-4-methylbenzimidazole (m. p. 205°–208° C.).
2-acetamido-4,6-dimethylbenzimidazole (m. p. 238°–239° C.).
2-propionamido-5,6-dimethylbenzimidazole (m. p. 288°–290° C.).
2-acetamido-4-methoxy-5-methylbenzimidazole (m. p. 199°–200° C.).
2-acetamido-5,6-dimethoxybenzimidazole (m. p. 316°–318° C.).
2-acetamido-6-trifluoromethylbenzimidazole (m. p. 302°–303° C. dec.).
2-acetamido-5-methoxybenzimidazole (m. p. 181°–182° C.);
2-acetamido-6-chlorobenzimidazole (m. p. 310°–311° C.);
2-acetamido-5,6-dichlorobenzimidazole;
2-acetamido-4,6-dibromobenzimidazole;
2-acetamido-5-iodobenzimidazole;
2-acetamido-5-fluoro-6-butoxybenzimidazole;
2-acetamido-4-hexoxybenzimidazole;
2-acetamido-4-hexylbenzimidazole;
2-acetamido-5-pentylbenzimidazole;
2-acetamido-6-fluorobenzimidazole;
and the like.

EXAMPLE 3

One thousand tablets for oral use, each containing 100 mg. of 2-acetamidp-5,6-dimethylbenzimidazole hydrochloride, are prepared from the following ingredietns:

2-acetamido-5,6-dimethylbenzimidazole hydrochloride —100Gm.
Methylcellulose, U. S. P. (15 cps.) — 6.5 Gm.
Talc   30Gm.
Calcium stearate   3.5 Gm.

The 2-acetamido-5,6-dimethylbenzimidazole hydrochloride and dicalcium phosphate are mixed well, granulated with 7.5 percent w/v aqueous solution of methylcellulose, passed through No. 8 screen and dried carefully. The dried granules are passed through a No. 12 screen, mixed with the talc and stearate and compressed into tablets.

The foregoing tablets are useful in the treatment of anxiety, hypertension and high blood pressure in adult humans at a dosage of two to 12 tablets per day.

EXAMPLE 4

One thousand two-piece hard gelatin capsules for oral use, each capsule containing 250 mg. of 2-acetamido-5,6-dimethylbenzimidazole and 15 mg. of phenobarbital, are prepared from the following ingredients:

2-acetamido-5,6-dimethylbenzimidazole   250 Gm.
Phenobarbital   15 Gm.
Corn starch   120 Gm.
Talc   60 Gm.
Magnesium stearate   25 Gm.

The finely powdered materials are mixed thoroughly, then filled into hard gelatin capsules of appropriate size.

The foregoing capsules are useful in treatment of adults with hypertension at a dosage of one to two capsules three times a day.

EXAMPLE 5

An aqueous oral preparation containing in each 5 ml. 50 mg. of 2-acetamido-6-(trifluoromethyl)benzimidazole hydrochloride, is prepared from the following ingredients:

2-acetamido-6-(trifluoromethyl)benzimidazole hydrochloride 100 Gm.
Methylparaben 7.5 Gm.
Propylparaben 2.5 Gm.
Saccharin sodium 12.5 Gm.
Sucrose 12.5 Gm.
Glycerin 3,000 ml.
Tragacanth powder 100 Gm.
Orange oil flavor 10 Gm.
F. D. and C. Orange dye 7.5 Gm.
Deionized water g. s. 10,000 ml.

The foregoing composition is useful in the control of hypertension, high blood pressure, and hyperactive behavior problems in children at a dosage of one teaspoonful one to four per day.

EXAMPLE 6

A sterile aqueous suspension for intramuscular injection, containing in each ml. 100 mg. of 2-acetamido-5,6-dimethylbenzimidazole hydrochloride is prepared from the following ingredietns:

2-acetamido-5,6-dimethylbenzimidazole hydrochloride 100 Gm.
Sodium carboxymethylcellulose, low viscosity 10 Gm.
Polysorbate 80, U. S. P. 4 Gm.
Propylparaben, U. S. P. 0.4 Gm.
Water for injection g. s. 1,000 ml.

The foregoing parenteral suspension is useful in the treatment of acute high blood pressure and agitation in a senile adult at a dosage of 1 ml. twice a day.

EXAMPLE 7

One thousand tablets for oral administration, each containing 25 mg. of 2-acetamido-5,6-dimethylbenzimidazole hydrochloride and 16.2 mg. of phenobarbital and 1 mg. reserpine are prepared from the following types and amounts of ingredients:

2-acetamido-5,6-dimethylbenzimidazole hydrochloride 25 Gm.
Phenobarbital 16.2 Gm.
Reserpine 1.0 Gm.
Lactose 175 Gm.
Starch 15 Gm.
Magnesium stearate 1.5 Gm.

The ingredients are thoroughly mixed and slugged. The slugs are broken down by forcing through a screen and the resulting granules are then compressed into tablets.

The preceding tablets are useful for the prevention of hyperactivity in children, one to four tablets per day.

EXAMPLE 8

One thousand ml. of an elixir, containing 100 mg. of 2-acetamido-5,6-diethylbenzimidazole hydrochloride and 8.1 mg. of phenobarbital in each 5 ml., is prepared from the following types of amounts of ingredients:

2-acetamido-5,6-diethylbenzimidazole hydrochloride 20 Gm.
Phenobarbital 1.62 Gm.
Citric acid 0.1 Gm.
F. D. C. Red No. 1 0.04 Gm.
Saccharin 0.1 Gm.
Sucrose 200 Gm.
Oil of spearmint 0.1 Gm.
Oil of wintergreen 0.1 Gm.
Polysorbate 80 U. S. P. 1 Gm.
Ethanol 95% 200 ml.
Glycerin 150 ml.
Water g. s. 1,000 ml.

The sugar is dissolved in 450 ml. of water and the citric acid, color and the 2-acetamido-5,6-diethylbenzimidazole hydrochloride added thereto. The phenobarbital and saccharin are added to the mixture of alcohol and glycerin and stirred until dissolved. The flavors are mixed with the polysorbate 80 and added to the alcohol-glycerin solution followed by the addition of the sugar solution and sufficient water to make 1,000 ml.

The syrup is useful in the treatment of hypertension of children at a dose of one teaspoonful three times a day.

EXAMPLE 9

One thousand capsules for oral administration are prepared from the following ingredients:

2-butylamido-4-bromobenzimidazole citrate 200 Gm.
Lactose, anhydrous 132.5 Gm.
Magnesium stearate powder 2.5 Gm.

The powders are mixed thoroughly and filled into No. 3 gelatin capsules.

The capsules are useful in the treatment of high blood pressure of adults at a dose of one capsule four times a day.

EXAMPLE 10

One thousand capsules for oral administration are prepared from the following ingredients:

2-acetamido-4,5-dimethoxybenzimidazole hydrochloride 50 Gm.
Lactose, anhydrous 207.5 Gm.
Magnesium stearate powder 2.5 Gm.

The powders are mixed thoroughly and filled into No. 3 hard gelatin capsules.

The capsules are useful in the treatment of hypertensive children at a dose of one capsule three times a day.

Following the procedure of the prior Examples 3 through 10, dosage forms are similar prepared by substituting equivalent amounts of other compounds of formula 1 such as:

2-acetamidobenzimidazole;
2-acetamido-5-methylbenzimidazole;
2-acetamido-4,6-dimethylbenzimidazole;
2-acetamido-5,6-dimethoxybenzimidazole;
2-acetamido-6-chlorobenzimidazole;
2-acetamido-5,6-dichlorobenzimidazole;
2-acetamido-5-hexoxybenzimidazole;
2-acetamido-4-hexylbenzimidazole;
2-acetamido-5-heptylbenzimidazole;
2-acetamido-6-fluorobenzimidazole;
2-acetamido-5,6-dipropylbenzimidazole;
2-acetamido-6-methoxybenzimidazole;
2-acetamido-4,6-dimethoxybenzimidazole;

and the like, for the compounds in the Examples.

I claim:

1. A method of treating high blood pressure in warm blooded hypertensive animals free of helminthic infestation comprising administering to said animal an antihypertensive effective amount of a compound of the formula:

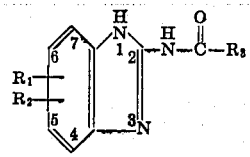

I wherein $R_1$ is selected from the group consisting of hydrogen, alkyl of one to six carbom atoms, inclusive; alkoxy of one to six carbon atoms, inclusive, chlorine, bromine, fluorine, and —$CF_3$, wherein $R_2$ is selected from the group consisting of hydrogen, alkyl of one to six carbon atoms, inclusive, chlorine, bromine, fluorine, alkoxy, of one to six carbon atoms, inclusive, and —$CF_3$; and wherein $R_3$ is alkyl of one to four carbon atoms, inclusive, or a pharmaceutical acceptably acid addition salt thereof, in association with a pharmaceutical carrier.

2. The method of claim 1, wherein the dosage to be administrated is from 50–1,500 mg. per day per human patient.

3. The method of claim 1 wherein the amount to be administered as single dose in animals is 5–50 mg./kg.

4. The method of claim 1 wherein the compound to be administered is 2-acetamido-5,6-dimethylbenzimidazole or a pharmacologically acceptable acid addition salt thereof.

* * * * *